US012396570B2

(12) United States Patent
Newman et al.

(10) Patent No.: US 12,396,570 B2
(45) Date of Patent: Aug. 26, 2025

(54) BREATHABLE CUSHION

(71) Applicant: BABYFI, INC., San Jose, CA (US)

(72) Inventors: Ana Gicova Newman, San Jose, CA (US); Daniel Anthony Young, San Jose, CA (US)

(73) Assignee: BABYFI, INC., Kyle, TX (US)

( * ) Notice: Subject to any disclaimer, the term of this patent is extended or adjusted under 35 U.S.C. 154(b) by 380 days.

(21) Appl. No.: 18/064,564

(22) Filed: Dec. 12, 2022

(65) Prior Publication Data

US 2024/0188725 A1 Jun. 13, 2024

(51) Int. Cl.

*A47C 27/06* (2006.01)
*A47G 27/02* (2006.01)
*B68G 5/00* (2006.01)

(52) U.S. Cl.

CPC ........ *A47C 27/065* (2013.01); *A47G 27/0212* (2013.01); *B68G 5/00* (2013.01)

(58) Field of Classification Search

CPC .............. A47G 9/10; A47G 2009/1018; A47G 9/1081; A47G 9/1009; A47G 9/0253; A47G 2200/106; A47G 9/109; A47G 9/1036; A47C 27/001; A47C 27/148; A47C 27/144; A47C 27/00; A47C 27/0456; A47C 31/123; A47C 27/062; A47C 27/065; A47C 27/20; A47C 31/12; A47C 7/02; A47D 15/008; B33Y 80/00; B33Y 10/00; B33Y 30/00; B33Y 50/00; B33Y 70/00; B29C 64/106

USPC ........................................... 5/636, 52.1, 724

See application file for complete search history.

(56) References Cited

U.S. PATENT DOCUMENTS

| | | | | |
|---|---|---|---|---|
| 2,931,427 | A | 4/1960 | Goldstein | |
| 5,561,876 | A | 10/1996 | Petruzella | |
| 10,744,914 | B2 | 8/2020 | Baek et al. | |
| 10,772,445 | B2 * | 9/2020 | Pearce | A47G 9/1027 |
| D898,438 | S | 10/2020 | Kim | |
| D930,397 | S | 9/2021 | Mi | |
| D959,176 | S | 8/2022 | Woodard et al. | |
| 2014/0259426 | A1 * | 9/2014 | Pearce | A47C 27/085 5/653 |

(Continued)

FOREIGN PATENT DOCUMENTS

| | | | | |
|---|---|---|---|---|
| CN | 210870669 U | * | 6/2020 | A47C 27/148 |
| CN | 212165489 U | * | 12/2020 | A47G 9/10 |

(Continued)

OTHER PUBLICATIONS

Amazon, "Japanese Style Rattan Bed Pillow," accessed on the Internet at: https://www.amazon.com/Japanese-Style-Rattan-Pillow-Inches/dp/B00ML2EIJO/ref=asc_df_B00ML2EIJO/?tag=hyprod-20&linkCode=df0&hvadid=238194517864&hvpos=&hvnetw=g&hvrand=12657970013223936542&hvpone=&hvptwo=&hvqmt=&hvdev=c&hvdvcmdl=&hvlocint=&hvlocphy=9021511&hvtargid=pla-393964416575&psc=1 (publicly available prior to Dec. 12, 2022).

(Continued)

*Primary Examiner* — Madison Emanski
(74) *Attorney, Agent, or Firm* — Barnes & Thornburg LLP

(57) ABSTRACT

A breathable cushion in accordance with the present disclosure includes a frame arranged inside a cover. The frame includes an outer rim, an inner rim spaced apart from the outer rim, and a lattice extending between the outer rim and the inner rim and defining an internal void of the frame. Apertures are formed through the lattice of the frame. The apertures and internal void allow airflow through the frame.

17 Claims, 14 Drawing Sheets

(56) References Cited

U.S. PATENT DOCUMENTS

| | | | | |
|---|---|---|---|---|
| 2016/0058203 | A1 | 3/2016 | Yaacoby | |
| 2018/0264718 | A1* | 9/2018 | McCluskey | B33Y 80/00 |

FOREIGN PATENT DOCUMENTS

| | | | | |
|---|---|---|---|---|
| FR | 2859615 | | 3/2005 | |
| JP | 3216651 | U | 6/2018 | |
| KR | 200411180 | | 3/2006 | |
| KR | 101999293 | | 7/2019 | |
| KR | 200494039 | | 7/2021 | |
| KR | 20210125698 | A | * 10/2021 | A47G 9/10 |
| KR | 102427301 | | 7/2022 | |

OTHER PUBLICATIONS

Babymoov, "Lovenest Original Baby Headrest Pillow," access on the Internet at: https://www.dunasty.com/products/lovenest-original-baby-headrest-pillow-dreamy%E2%84%A2 (publicly available prior to Dec. 12, 2022).

Berklan, "Supportive Pillow for Neck Shoulder Pain Relief Sleep," accessed on the Internet at: https://www.amazon.com/Berklan-Pillow/dp/B091MZ8HM5/ref=asc_df_B091MZ8HM5/?tag=2hyprod-20&linkCode=df0&hvadid=507689168320&hvpos=&hvnetw=g&hvrand=9809525547543238165&hvpone=&hvptwo=&hvqmt=&hvdev=c&hvdvcmdl=hvlocint=&hvlocphy=9021511&hvtargid=pla-1483207847192&th=1 (Apr. 3, 2021).

Coyuchi, "Turiya™ Organic Latex Pillow," accessed on the Internet at: https://www.coyuchi.com/turiya-organic-latex-pillow.html?utm_campaign=18104714048&utm_source=google&utm_medium=cpc&utm_term=&adgroupid=&gclid=EAlaIQobChMI08iKvN_u-QIVrSCtBh1YGwYkEAQYAyABEgJUZ_D_BwE (publicly available prior to Dec. 12, 2022).

Kickstarter, "Silver Pillow: The Self-Cleaning Smart Pillow," accessed on the Internet at: https://www.kickstarter.com/projects/beclothed/the-smart-pillow-enhance-your-night (publicly available prior to Dec. 12, 2022).

Malouf Z® "Aromatherapy Zoned Dough™ Camomile Pillow," accessed on the Internet at: https://www.drsnooze.com/malouf-z-aromatherapy-zoned-dough-chamomile-pillow (publicly available prior to Dec. 12, 2022).

Meishunqi, "Adjustable 3d mesh pillow," accessed on the Internet at: https://www.meshtextile.com/pillow1/adjustable-3d-mesh-pillow.html (publicly available prior to Dec. 12, 2022).

Milo & Gabby, "3D Air Mesh Playtime Pillow," accessed on the Internet at: https://innobaby.com/milo-gabby-3d-air-mesh-playtime-pillow/ (publicly available prior to Dec. 12, 2022).

Osteo, "Cervical Pillow for Neck Pain Relief," accessed on the Internet at: https://www.macao.ubuy.com/en/product/41SRIOPJU-osteo-cervical-pillow-for-neck-pain-relief-hollow-designodorless-memory-foam-pillows-with-cooling-case-adjustable-orthopedic-bed-pillow-for (Nov. 2, 2021).

Sears, "Zone Tech Mesh Hollow Car Chair Seat Beige Back Spine Lumbar Support Pillow," accessed on the Internet at: https://www.sears.com/zone-tech-bs0003-zone-tech-mesh-hollow-car/p-SPM10448774908 (publicly available prior to Dec. 12, 2022).

* cited by examiner

BREATHABLE CUSHION

FIELD OF THE DISCLOSURE

The present disclosure relates generally to cushions, and more specifically to breathable cushions for supporting a user's head or softening impacts on a supporting surface.

BACKGROUND

Cushions containing filling material reduce or eliminate airflow through the cushion. The filling material can also trap unwanted contaminants, and make washing or maintenance of the cushion difficult. Accordingly, there is a need for a cushion having breathability and ease of maintenance.

SUMMARY

According to an aspect of the present disclosure, a breathable cushion frame may include an outer rim, an inner rim spaced apart from the outer rim, and a lattice extending between the outer rim and the inner rim. The lattice may include a first webbing extending between the outer rim and the inner rim and a second webbing extending between the outer rim and the inner rim.

In illustrative embodiments, the second webbing may be spaced apart from the first webbing to define an internal void of the breathable cushion frame.

In illustrative embodiments, the first and second webbings may each include a plurality of interconnected web members defining a plurality of apertures through the lattice.

In illustrative embodiments, the internal void may be continuous around the inner rim, and the inner rim may define an opening through the breathable cushion frame.

In illustrative embodiments, the frame may be arranged inside a cover.

These and other features of the present disclosure will become more apparent from the following description of the illustrative embodiments.

BRIEF DESCRIPTION OF THE DRAWINGS

The drawings disclose exemplary embodiments in which like reference characters designate the same or similar parts throughout the figures, of which.

DETAILED DESCRIPTION

Figure 1:
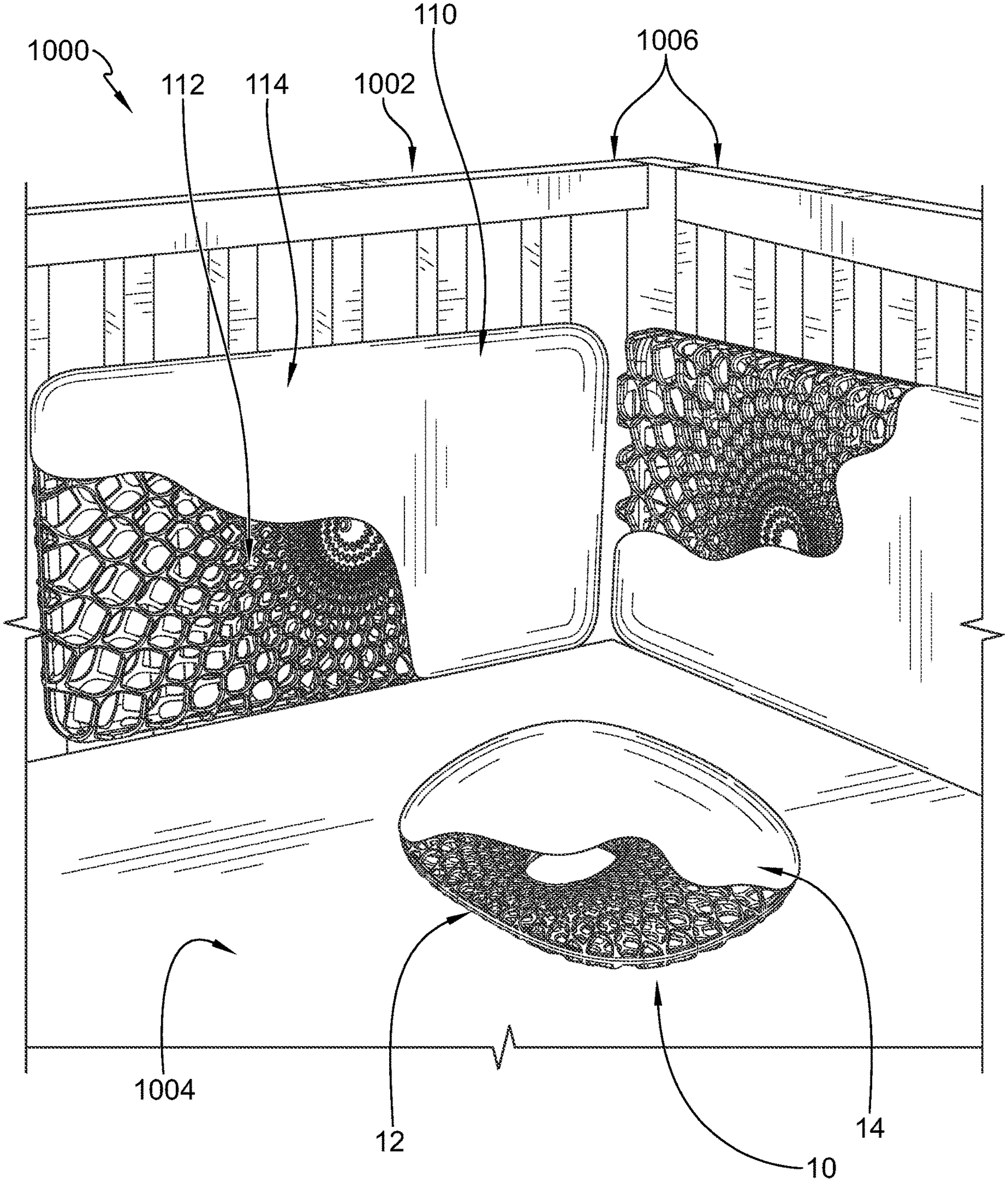
FIG. 1 is a perspective view of a bed having a support structure with walls and a mattress arranged on the support structure and showing various embodiments of breathable cushions in accordance with the present disclosure arranged on the bed.

As used in the following description, the terms "horizontal", "vertical", "left", "right", "up" and "down", "upper" and "lower", "inner" and "outer", "front" and "rear", "top" and "bottom" as well as adjectival and adverbial derivatives thereof (for example, "horizontally", "upwardly", or the like), simply refer to the orientation of the illustrated structure and are not intended to be limiting to the scope of the disclosure.

For the purposes of promoting an understanding of the principles of the disclosure, reference will now be made to a number of illustrative embodiments illustrated in the drawings and specific language will be used to describe the same.

Illustrative breathable cushions 10, 110 in accordance with the present disclosure are shown in FIG. 1. The breathable cushion 10 includes a frame 12 arranged inside a cover 14. In the illustrative embodiment, the cover 14 is a flexible, breathable material. In some embodiments, the cover 14 is formed from woven or non-woven fabric, such as muslin cotton or mesh fabric. In some embodiments, a passage is formed through the cover 14 to allow insertion and removal of the frame 12 from the cover 14, and the passage can be closed with snap fasteners or a zipper, for example.

In the exemplary embodiment, the breathable cushion 110 includes a frame 112 arranged inside a cover 114 as shown in FIG. 1. The cover 114 is a flexible, breathable material. In some embodiments, the cover 114 is formed from woven or non-woven fabric, such as muslin cotton or mesh fabric. In some embodiments, a passage is formed through the cover 114 to allow insertion and removal of the frame 112 from the cover 114, and the passage can be closed with snap fasteners or a zipper, for example. In some embodiments, the breathable cushion 110 is sized to be shorter than the walls 1006. In some embodiments, the breathable cushion 110 is sized to substantially extend from the mattress 1004 to a top rail of the wall 1006.

FIG. 1 illustratively shows the breathable cushions 10, 110 arranged on a bed 1000, such as a crib. In the exemplary embodiment, the bed 1000 includes a support structure 1002 having walls 1006 and a mattress 1004 arranged on the support structure 1002. In some embodiments, the breathable cushion 10 is configured to support the head of a user, such as an infant, laying on the mattress 1004. In some embodiments, the breathable cushion 110 is arranged along the wall 1006, or another surface, and configured to soften impacts on the wall 1006 or other supporting surface. In some embodiments, the cover 114 includes ties for securing the breathable cushion 110 on the wall 1006.

Figure 2:
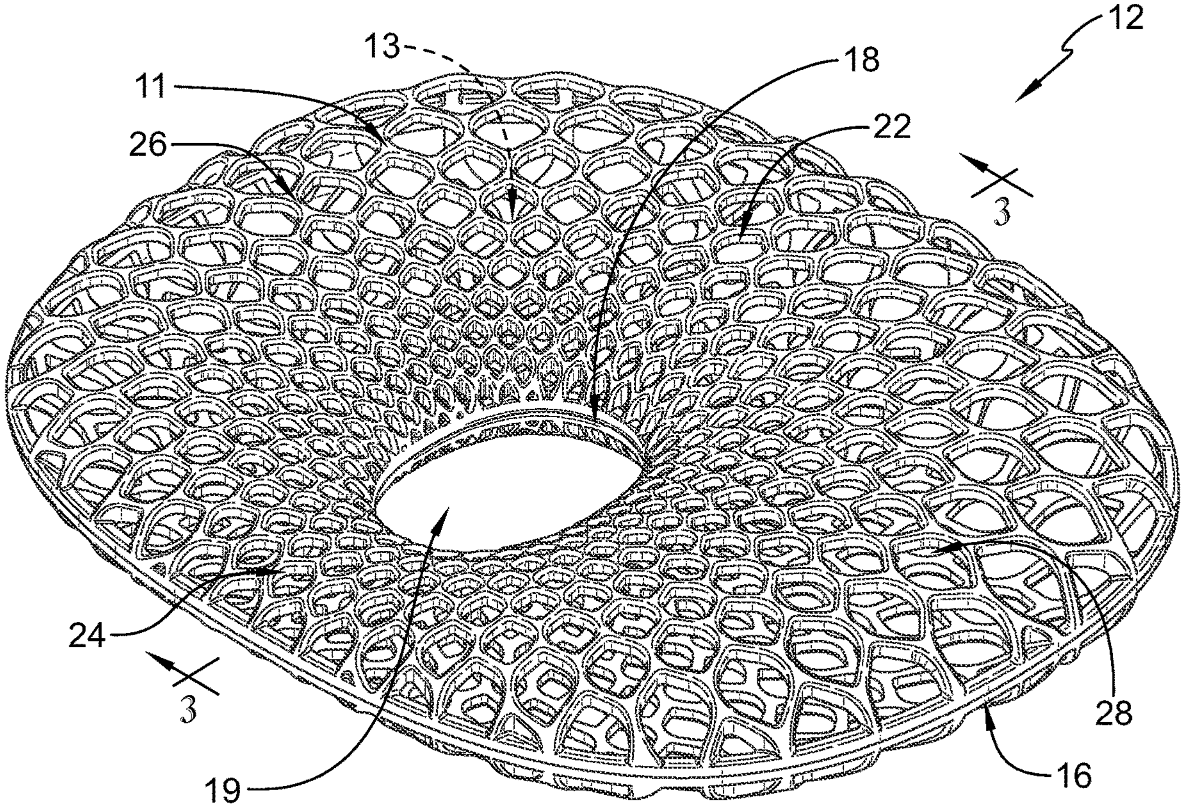
FIG. 2 is a perspective view of one embodiment of a breathable cushion frame in accordance with the present disclosure showing that the frame includes inner and outer rims and a lattice extending between the inner and outer rims.
Figure 3:
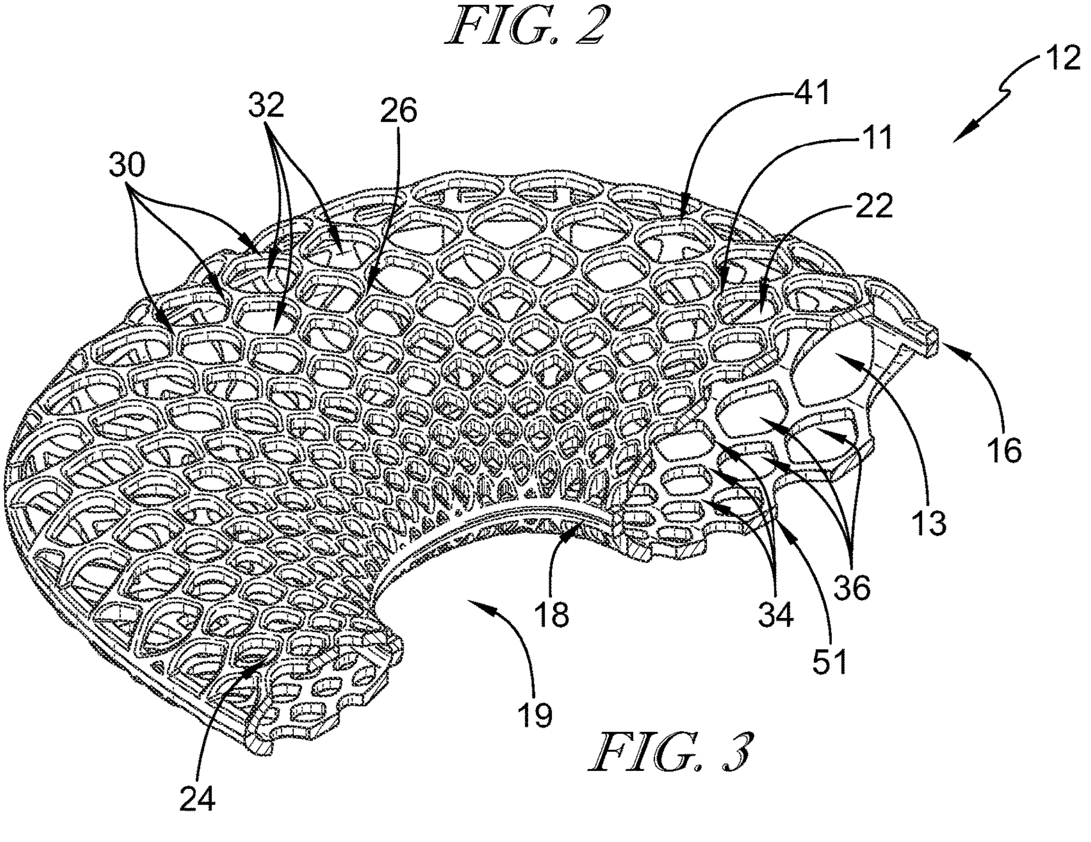
FIG. 3 is sectional view taken along line 3-3 in FIG. 2 showing that the lattice includes a first webbing extending between the inner and outer rims and a second webbing extending between the inner and outer rims and spaced apart from the first webbing to define an internal void of the breathable cushion frame around the inner rim, and that each of the first and second webbings includes a plurality of interconnected web members defining a plurality of apertures through the lattice.
Figure 5:
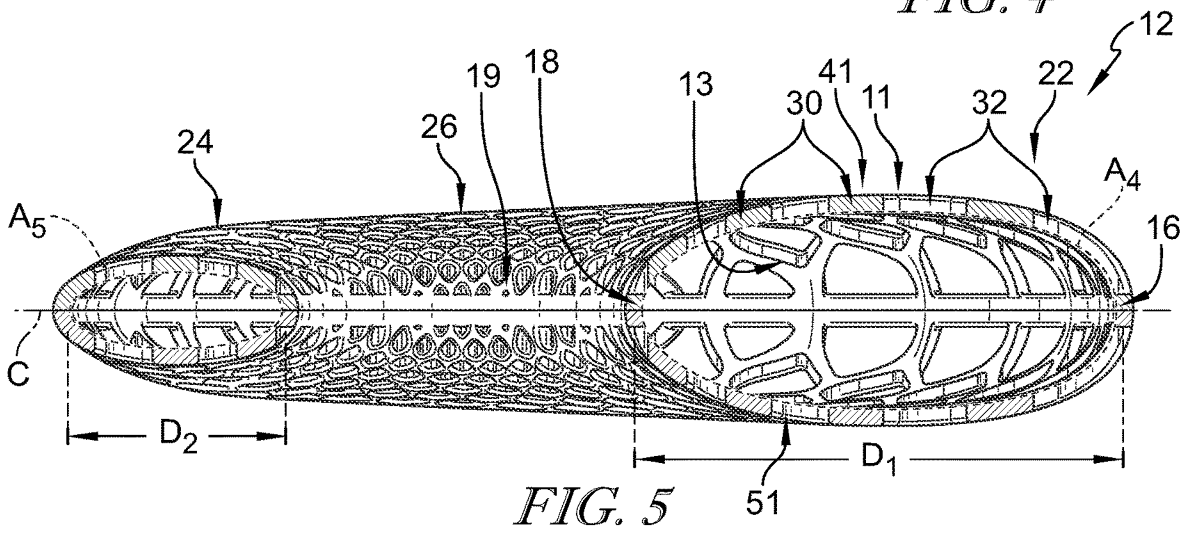
FIG. 5 is sectional view taken along line 5-5 in FIG. 4 showing that in the illustrative embodiment the inner rim is arranged at a first distance away from the outer rim toward a rear of the breathable cushion frame and at a second shorter distance from the outer rim toward a front of the frame and that a cross sectional area of a rear section of the frame is larger than a cross sectional area of a front section of the frame along a centerline of the frame.

The illustrative breathable cushion frame 12 includes an outer rim 16, an inner rim 18, and a lattice 11 extending between the outer and inner rims 16, 18 as shown in FIG. 2. In some embodiments, the lattice 11 includes a first webbing 41 extending between the outer rim 16 and the inner rim 18 and a second webbing 51 extending between the outer rim 16 and the inner rim 18 and spaced apart from the first webbing 41 to define an internal void 13 of the breathable cushion frame 12 around the inner rim 18 as shown in FIGS. 2 and 3. The first webbing 41 and second webbing 51 are arranged closer together adjacent the outer and inner rims 16, 18 and farther apart between the outer and inner rims 16, 18 as shown in FIGS. 3 and 5.

Each of the first and second webbings 41, 51 includes a plurality of interconnected web members 30, 34, respectively, defining a plurality of apertures 32, 36, respectively, through the lattice 11. The apertures 32, 36 and internal void 13 allow free airflow through the frame 12 to maximize breathability of the cushion 10. In some embodiments, the internal void 13 is free of bulk filling material, such as down or feathers, natural or synthetic fiber fill, foam fill, beads, or other filling materials that can inhibit airflow through the frame 12. In some embodiments, the internal void 13 is continuous around the inner rim 18. In some embodiments, the frame 12 defines a continuous tube extending around the opening 19.

Figure 4:
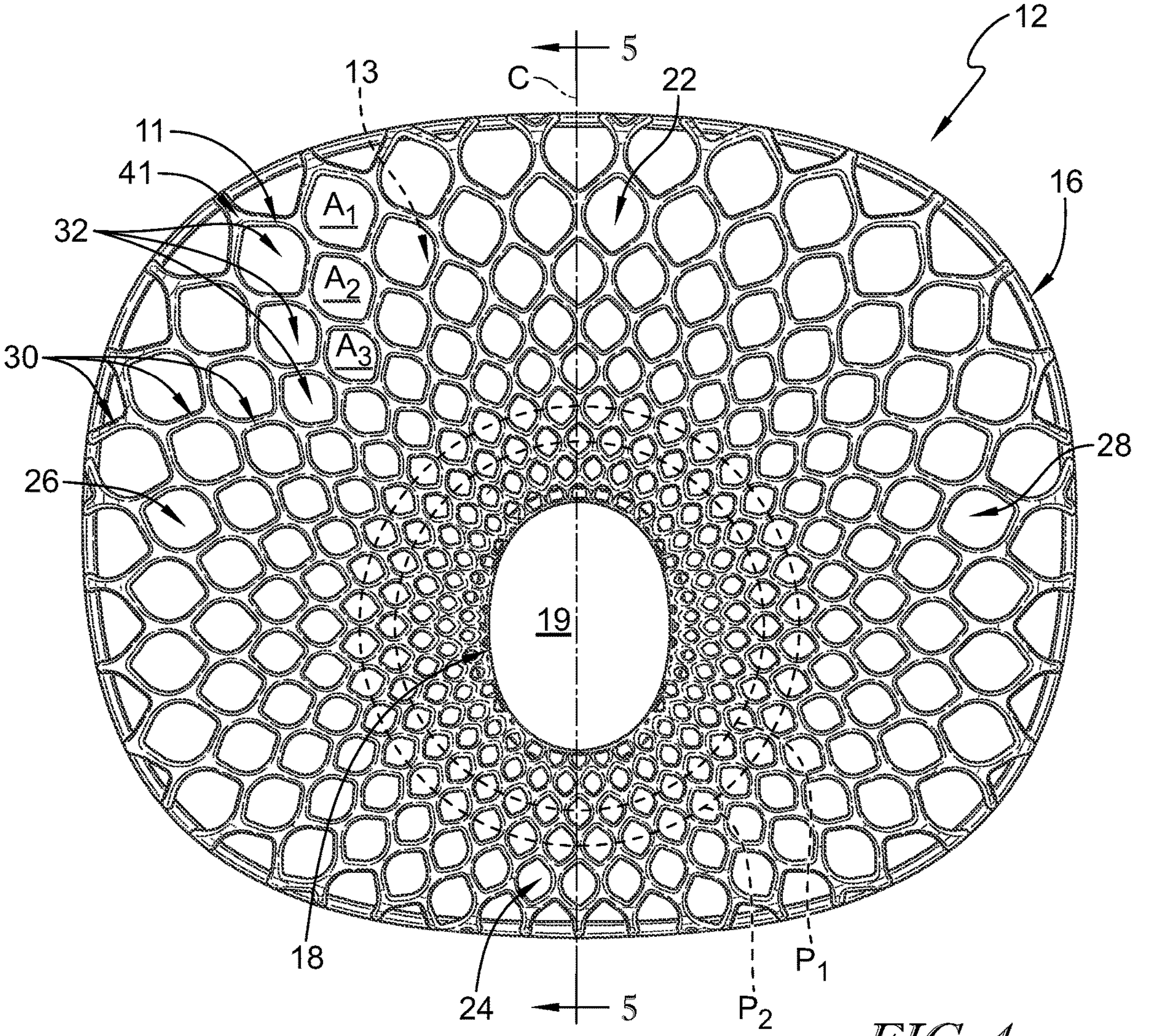
FIG. 4 is a top plan view of the breathable cushion frame of FIG. 1 showing that the apertures are arranged in offset repeating patterns around the inner rim and that apertures arranged along patterns closer to the inner rim have smaller opening areas than apertures arranged farther from the inner rim.

In the illustrative embodiment, the inner rim 18 defines an opening 19 through the frame 12 as shown in FIG. 2. The frame 12 defines a rear section 22, a front section 24, a left-side section 26, and a right-side section 28 around the opening 19. The front section 24 is arranged at an opposite side of the opening 19 from the rear section 22, the left-side section 26 extends between the rear and front sections 22, 24, and the right-side section 28 extends between the rear and front sections 22, 24 at an opposite side of the opening 19 from the left-side section 26. In some embodiments, the frame 12 is symmetrical left to right and/or top to bottom across a centerline C of the frame 12 extending through the rear and front sections 22, 24 as shown in FIGS. 4 and 5. In some embodiments, the outer and inner rims 16, 18 are arranged along a common plane extending along the centerline C. In some embodiments, the outer rim 16 is arranged along a first plane and the inner rim 18 is arranged along a second plane spaced apart from the first plane. In some embodiments, the outer rim 16 is oblong along a first direction (e.g., perpendicular to the centerline C), and the inner rim 18 is oblong along a second direction substantially perpendicular to the first direction (e.g., along the centerline C) as shown in FIG. 4. The outer and inner rims 16, 18 can assume other geometric and non-geometric shapes as contemplated by the present disclosure.

The apertures 32, 36 are arranged along the lattice 11 as shown in FIGS. 3-5 and 8. In some embodiments, the apertures 32, 36 are distributed along the lattice 11 in offset repeating patterns around the inner rim 18. The patterns can be geometrical or non-geometrical shapes, for example. In the illustrative embodiment, the patterns are circular, and successively reduce in diameter from the outer rim 16 to the inner rim 18. Exemplary first and second patterns $P_1$, $P_2$ are shown in FIG. 4. The apertures 32, 36 distributed along the pattern $P_1$ are offset circumferentially from the apertures 32, 36 distributed along the pattern $P_2$. The apertures 32, 36 distributed along the pattern $P_1$ are also arranged closer to the inner rim 18 than the apertures 32, 36 distributed along the pattern $P_2$. In some embodiments, the apertures 32, 36 in successive patterns are aligned. In some embodiments, the apertures 32 are arranged along different patterns than the apertures 36. In some embodiments, the apertures 32, 36 are arranged evenly within each pattern.

Figure 8:
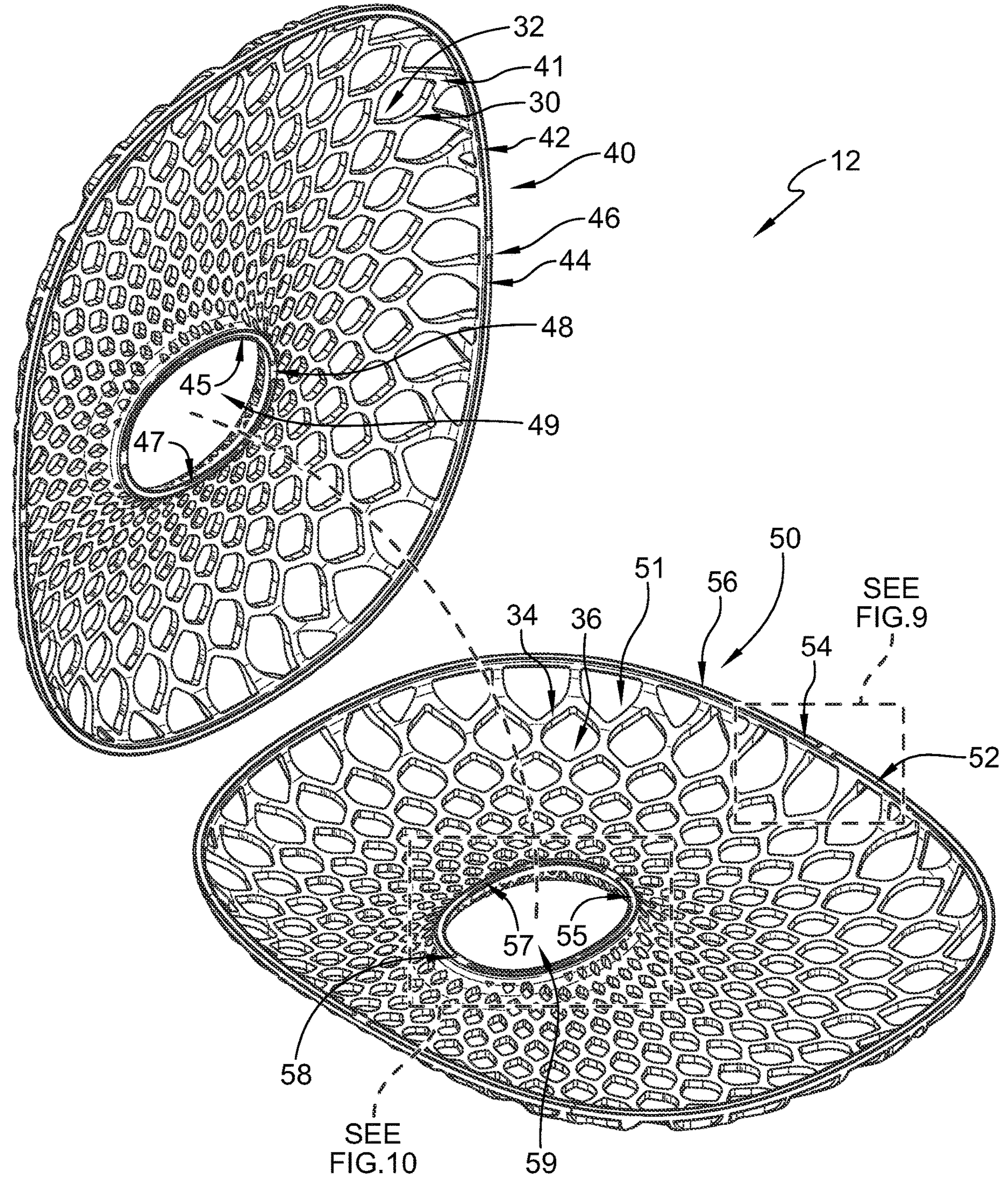
FIG. 8 is an exploded perspective assembly view of the breathable cushion frame of FIG. 1 showing that in the illustrative embodiment the frame includes a first shell including the first webbing and portions of the inner and outer rims and a second shell including the second webbing and portions of the inner and outer rims, and suggesting that the first shell is coupled to the second shell along the portions of the inner and outer rims.

In the illustrative embodiment, apertures 32, 36 arranged closer to the inner rim 18 have smaller opening areas than apertures 32, 36 arranged farther from the inner rim 18 as shown in FIGS. 4 and 8. In some embodiments, apertures 32, 36 distributed along patterns arranged closer to the inner rim 18 have smaller opening areas than apertures 32, 36 distributed along patterns arranged farther from the inner rim 18. Exemplary opening areas $A_1$, $A_2$, $A_3$ of various apertures 32, 36 arranged successively closer to the inner rim 18 are shown in FIG. 4. The opening area $A_3$ is smaller than the opening area $A_2$, which is smaller than the opening area $A_1$. In some embodiments, the apertures 32, 36 are oblong with opposing points arranged toward the outer and inner rims 16, 18 as shown in FIG. 4. In some embodiments, the apertures 32, 36 have other geometric or non-geometric shapes.

Figure 6:
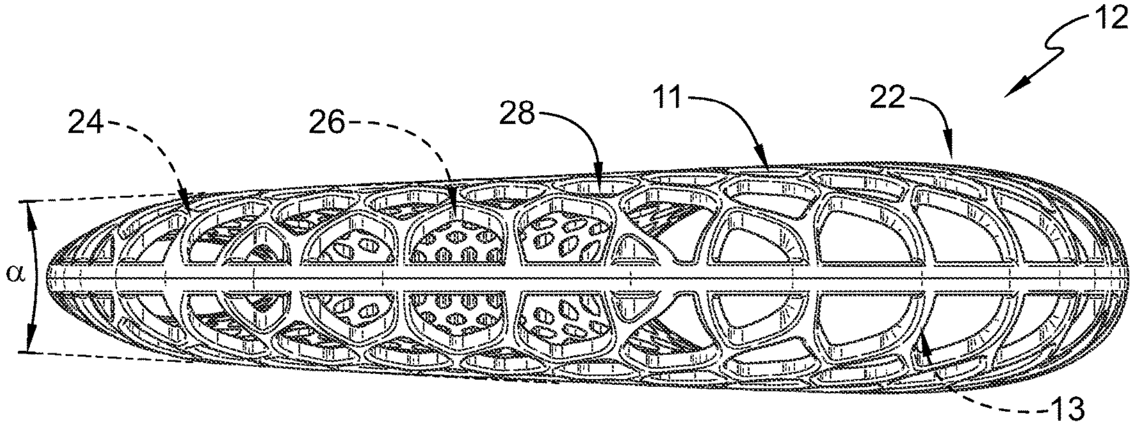
FIG. 6 is a right-side elevation view of the breathable cushion frame of FIG. 1 showing that the breathable cushion frame tapers from front to rear at a taper angle.
Figure 7:
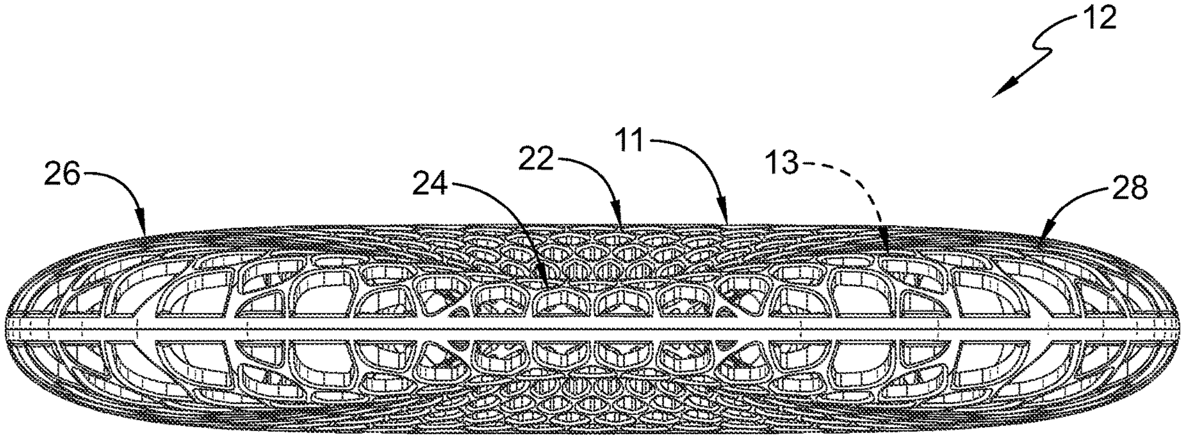
FIG. 7 is a front elevation view of the breathable cushion frame of FIG. 1 showing that the front section reduces in cross sectional area from left and right toward the centerline of the frame.

In some embodiments, the inner rim 18 is arranged at a first distance $D_1$ away from the outer rim 16 in the rear section 22 of the frame 12 and at a second shorter distance $D_2$ from the outer rim 16 in the front section 24 of the frame 12 as shown in FIG. 5. In the exemplary embodiment, a cross sectional area $A_4$ of the rear section 22 is larger than a cross sectional area $A_5$ of the front section 24 along the centerline C of the frame 12. In some embodiments, the frame 12 tapers at a taper angle $\alpha$ as the frame 12 extends from the front section 24 toward the rear section 22 as shown in FIG. 6. In some embodiments, the taper angle $\alpha$ is less than 10°. In some embodiments, the front section 24 reduces in cross sectional area from left and right toward the centerline C of the frame 12 as shown in FIG. 7.

In some embodiments, the frame 12 includes a first shell 40 and a second shell 50 coupled to the first shell 40 as shown in FIG. 8. In the illustrative embodiment, the first shell 40 includes the first webbing 41 and portions 46, 48 of the outer and inner rims 16, 18, respectively, with the inner rim portion 48 defining an opening 49 through the first shell 40. The second shell 50 includes the second webbing 51 and portions 56, 58 of the outer and inner rims 16, 18, respectively, with the inner rim portion 58 defining an opening 59 through the second shell 50. In some embodiments, the shells 40, 50 are substantially identical and symmetrical to one another, and arranged to position the outer and inner rim portions 146, 148 toward the outer and inner rim portions 156, 158.

Figure 9:
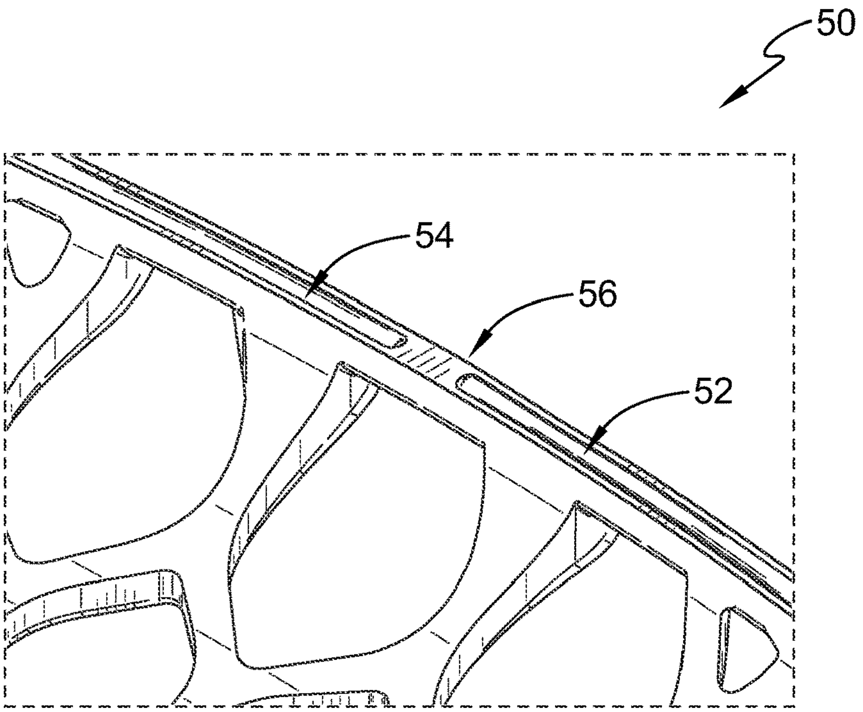
FIG. 9 is an enlarged view of the breathable cushion frame of FIG. 8 showing that complementary detents are formed on the outer rim portions for alignment of the outer rim portions of the first and second shells.
Figure 10:
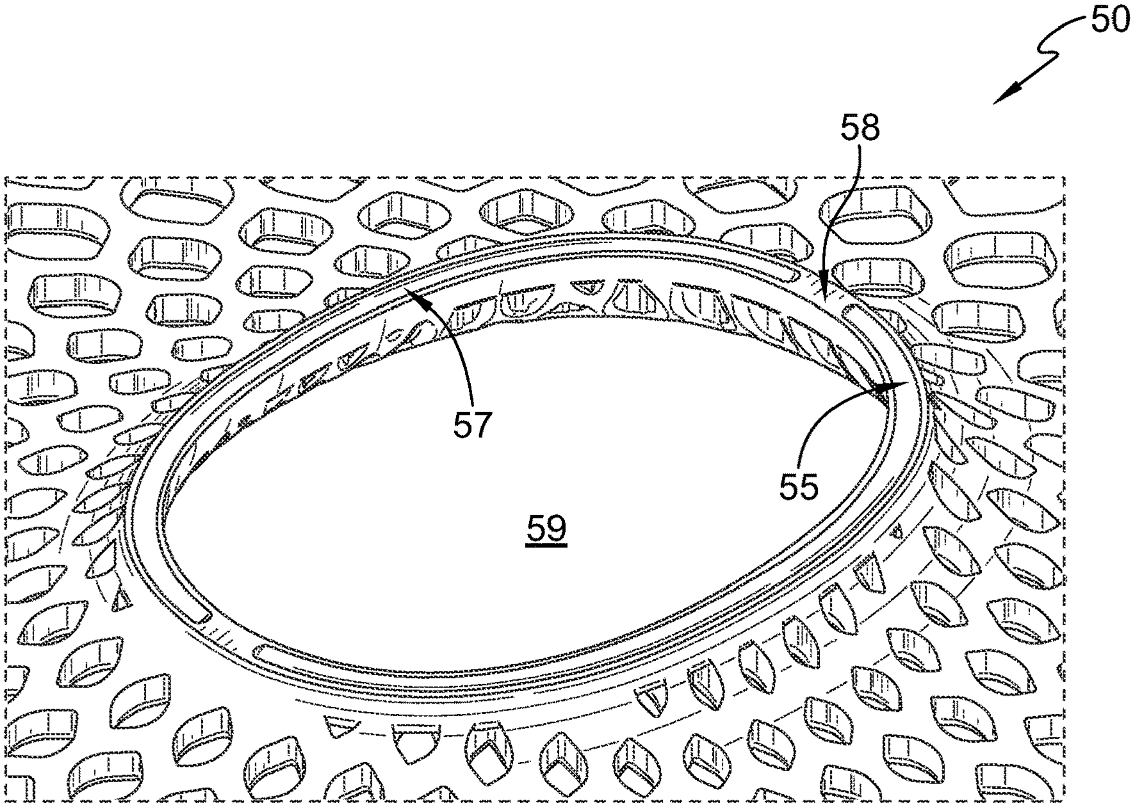
FIG. 10 is an enlarged view of the breathable cushion frame of FIG. 8 showing that complementary detents are formed on the inner rim portions for alignment of the inner rim portions of the first and second shells.

In some embodiments, complementary detents 42, 52 and 44, 54 are formed on the outer rim portions 46, 56, respectively, for alignment of the outer rim portions 46, 56 of the first and second shells 40, 50 as shown in FIGS. 8 and 9. For example, the detent 42 may be a recess formed into the outer rim portion 46 and the detent 52 may be a protrusion extending from the outer rim portion 56 and configured to be received in the recess of the detent 42 with the first shell 40 coupled to the second shell 50. The detents 52, 54 may be the same or different, with the detents 42, 44 being the opposite complement to the detents 52, 54, respectively. In some embodiments, complementary detents 45, 55 and 47, 57 are formed on the inner rim portions 48, 58, respectively, for alignment of the inner rim portions 48, 58 of the first and second shells 40, 50 as shown in FIGS. 8 and 10. For example, the detent 45 may be a recess formed into the inner rim portion 48 and the detent 55 may be a protrusion extending from the inner rim portion 58 and configured to be received in the recess of the detent 45 with the first shell 40 coupled to the second shell 50. The detents 55, 57 may be the same or different, with the detents 45, 47 being the opposite complement to the detents 55, 57, respectively.

In some embodiments, the first shell 40 is formed as a unitary and integral structure and the second shell 50 is formed as a separate unitary and integral structure. In some embodiments, the first shell 40 is coupled to the second shell 50 along the outer rim portions 46, 56 and the inner rim portions 48, 58 by an adhesive, ultrasonic welding, or heat press process among other processes contemplated by the present disclosure. In some embodiments, the frame 12 is formed as a unitary and integral structure. In some embodiments, the outer rim 16 and/or inner rim 18 are segmented and/or removed entirely such that the first and second webbings 41, 51 engage with one another along the various sections 22, 24, 26, 28 of the frame 12 to define the lattice 11 and internal void 13.

In some embodiments, the frame 12 is formed of a flexible, resilient material. In some embodiments, the frame 12 is formed from a food-grade thermoplastic polyurethane (TPU) material. In some embodiments, the material used to form the frame 12 has a Shore A durometer hardness of about 75 to about 90. In some embodiments, the frame 12 is molded, such as using an injection, cast, or compression molding process.

Figure 11:
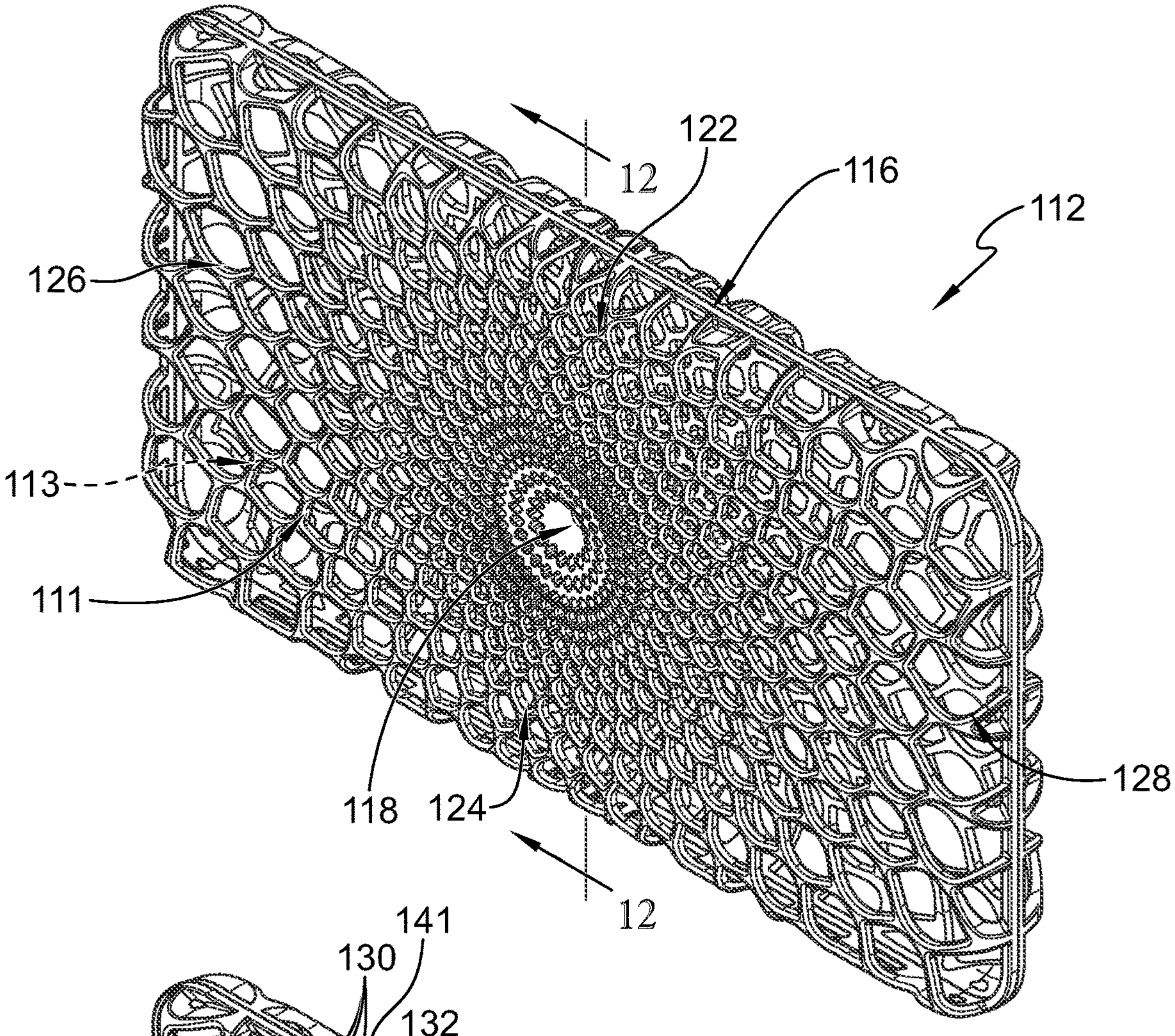
FIG. 11 is a perspective view of another embodiment of a breathable cushion frame in accordance with the present disclosure showing that the frame includes inner and outer rims and a lattice extending between the inner and outer rims.
Figure 12:
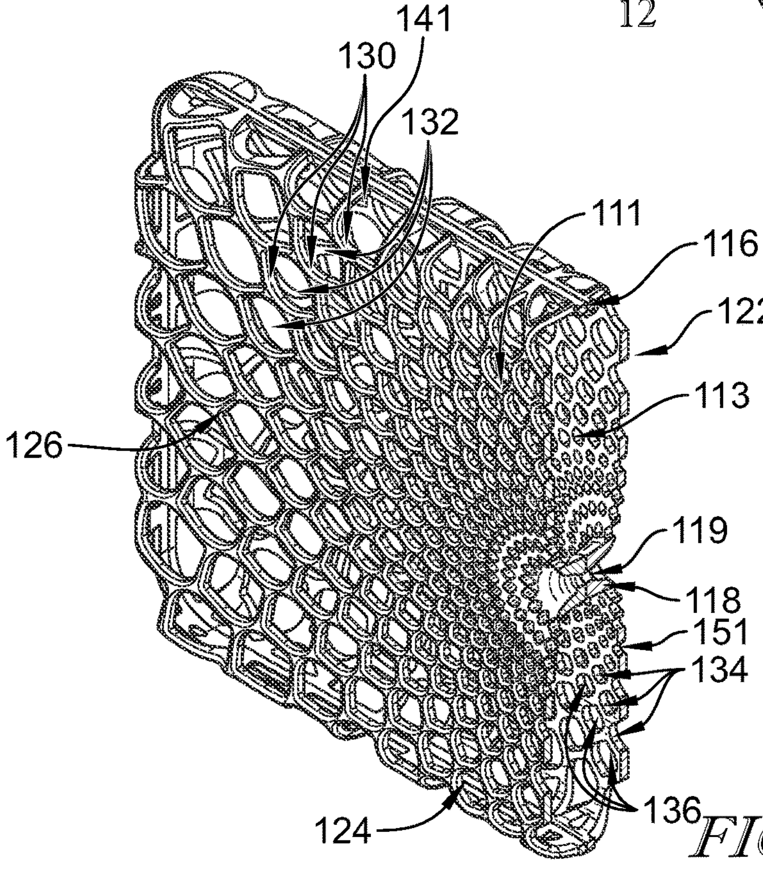
FIG. 12 is sectional view taken along line 12-12 in FIG. 11 showing that the lattice includes a first webbing extending between the inner and outer rims and a second webbing extending between the inner and outer rims and spaced apart from the first webbing to define an internal void of the breathable cushion frame around the inner rim, and that each of the first and second webbings includes a plurality of interconnected web members defining a plurality of apertures through the lattice.
Figure 14:
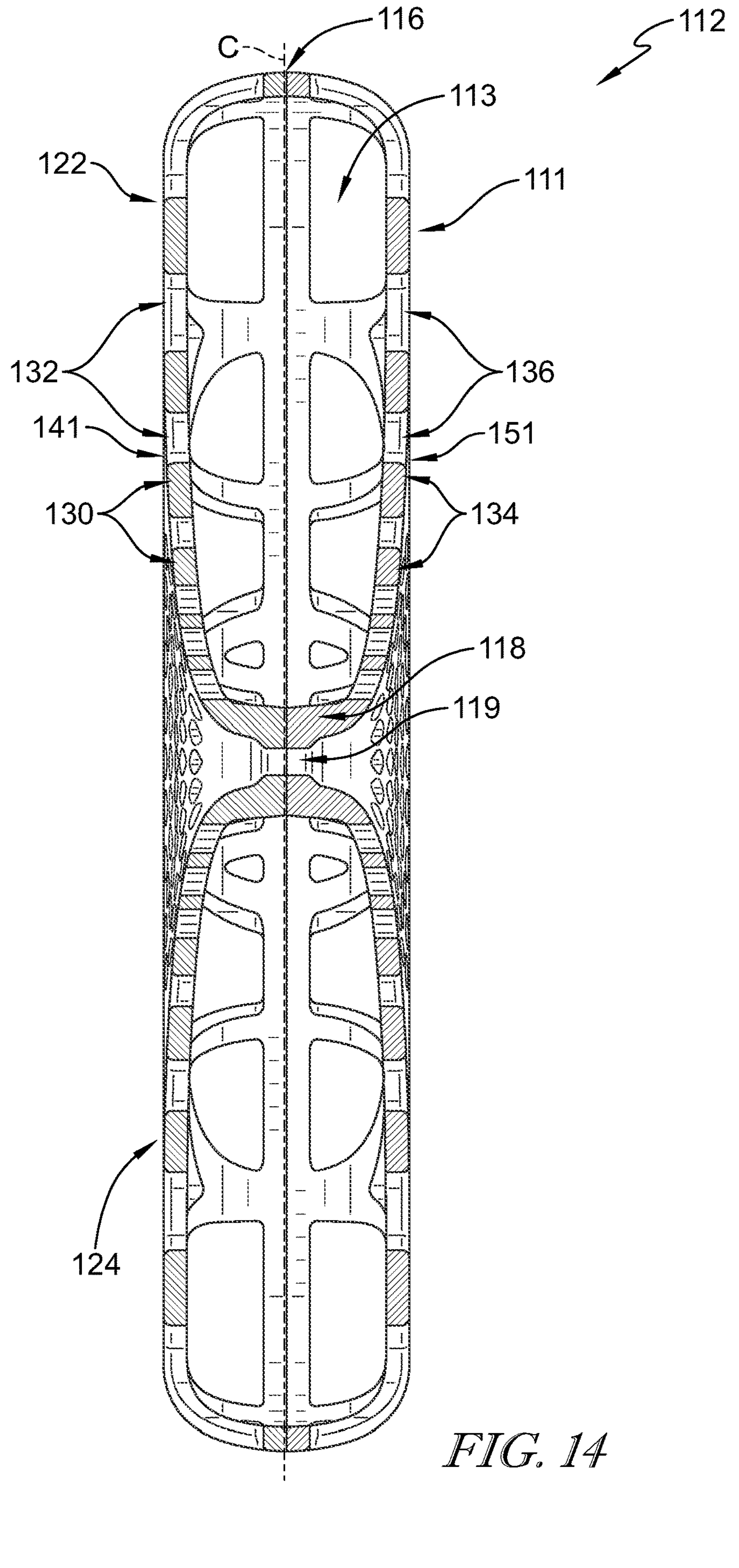
FIG. 14 is sectional view taken along line 14-14 in FIG. 13 and showing that the first webbing extends substantially along a first plane between the inner and outer rims and the second webbing extends between the inner and outer rims substantially along a second plane spaced apart from the first plane.
Figure 15:
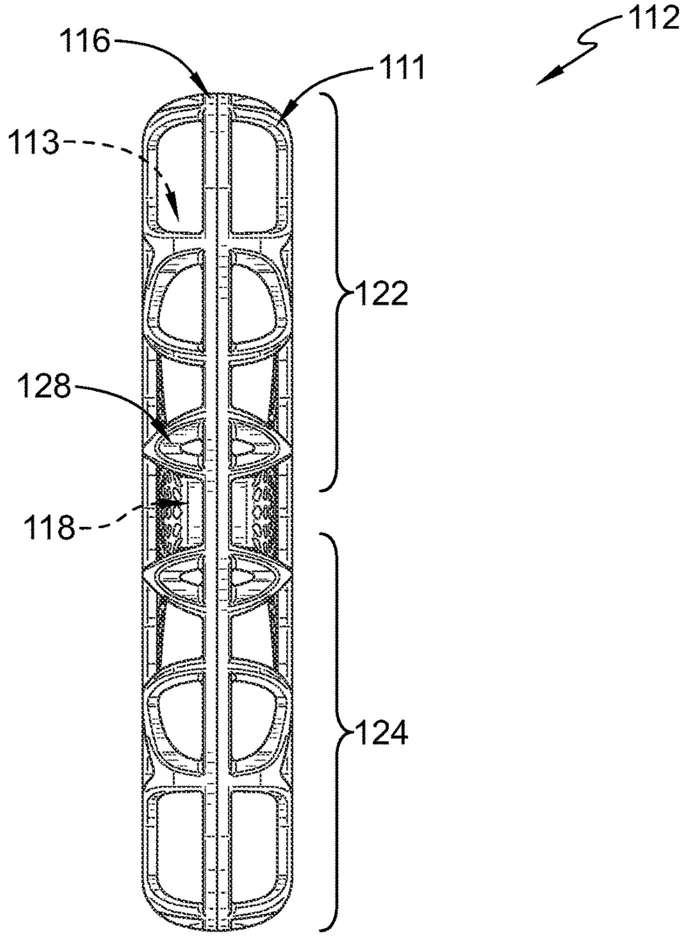
FIG. 15 is a right-side elevation view of the breathable cushion frame of FIG. 11.
Figure 16:
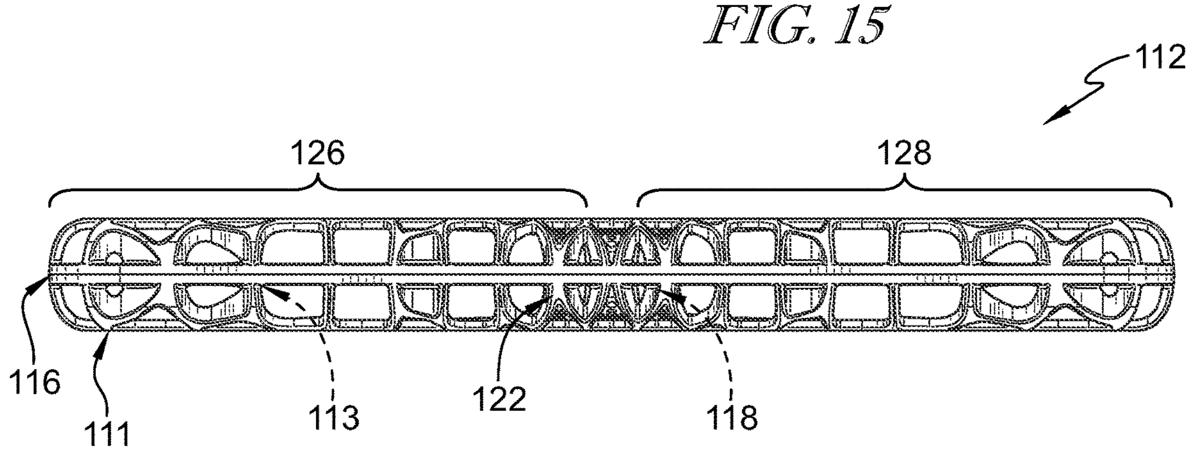
FIG. 16 is a front elevation view of the breathable cushion frame of FIG. 11.

According to other embodiments, the illustrative breathable cushion frame 112 includes an outer rim 116, an inner rim 118, and a lattice 111 extending between the outer and inner rims 116, 118 as shown in FIG. 11. In some embodiments, the lattice 111 includes a first webbing 141 extending between the outer rim 116 and the inner rim 118 and a second webbing 151 extending between the outer rim 116 and the inner rim 118 and spaced apart from the first webbing 141 to define an internal void 113 of the breathable cushion frame 112 around the inner rim 118 as shown in FIGS. 11 and 12. The first webbing 141 and second webbing 151 are arranged closer together adjacent the outer and inner rims 116, 118 and farther apart between the outer and inner rims 116, 118 as shown in FIGS. 12 and 14.

Each of the first and second webbings 141, 151 includes a plurality of interconnected web members 130, 134, respectively, defining a plurality of apertures 132, 136, respectively, through the lattice 111. The apertures 132, 136 and internal void 113 allow free airflow through the frame 112 to maximize breathability of the cushion 110. In some embodiments, the internal void 113 is free of bulk filling material, such as down or feathers, natural or synthetic fiber fill, foam fill, beads, or other filling materials that can inhibit airflow through the frame 112. In some embodiments, the internal void 113 is continuous around the inner rim 118. In some embodiments, the frame 112 defines a continuous tube extending around the opening 119.

Figure 13:
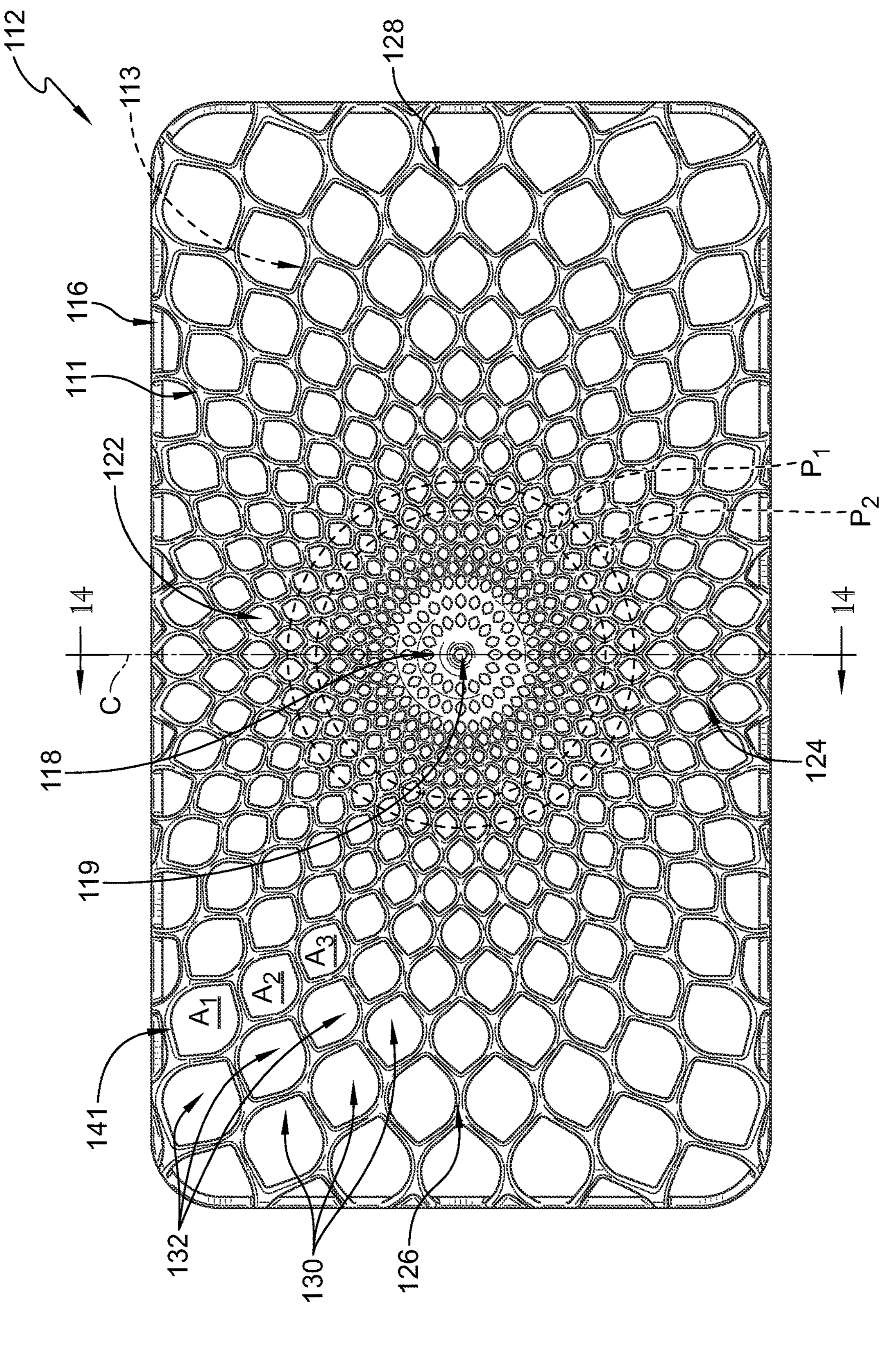
FIG. 13 is a top plan view of the breathable cushion frame of FIG. 11 showing that the apertures are arranged in offset repeating patterns around the inner rim and that apertures arranged along patterns closer to the inner rim have smaller opening areas than apertures arranged farther from the inner rim.

In the illustrative embodiment, the inner rim 118 defines an opening 119 through the frame 112 as shown in FIG. 11. The frame 112 defines a rear section 122, a front section 124, a left-side section 126, and a right-side section 128 around the opening 119. The front section 124 is arranged at an opposite side of the opening 119 from the rear section 122, the left-side section 126 extends between the rear and front sections 122, 124, and the right-side section 128 extends between the rear and front sections 122, 124 at an opposite side of the opening 119 from the left-side section 126. In some embodiments, the frame 112 is symmetrical left to right and/or top to bottom across a centerline C of the frame 112 extending through the rear and front sections 122, 124 as shown in FIGS. 13 and 14. In some embodiments, the first webbing 141 extends substantially along a first plane between the outer and inner rims 116, 118, and the second webbing 151 extends substantially along a spaced apart second plane between the outer and inner rims 116, 118 as shown in FIGS. 11 and 14-17. In some embodiments, the outer and inner rims 116, 118 are arranged along a common third plane extending along the centerline C. In some embodiments, the outer rim 116 is arranged along a fourth plane and the inner rim 118 is arranged along a fifth plane spaced apart from the fourth plane. In some embodiments, the outer rim 116 is substantially rectangular as shown in FIG. 11. The outer and inner rims 116, 118 can assume other geometric, such as square, and non-geometric shapes as contemplated by the present disclosure.

The apertures 132, 136 are arranged along the lattice 111 as shown in FIGS. 12-14 and 17. In some embodiments, the apertures 132, 136 are distributed along the lattice 111 in offset repeating patterns around the inner rim 118. The patterns can be geometrical or non-geometrical shapes, for example. In the illustrative embodiment, the patterns are circular, and successively reduce in diameter from the outer rim 116 to the inner rim 118. Exemplary first and second patterns $P_1$. $P_2$ are shown in FIG. 13. The apertures 132, 136 distributed along the pattern $P_1$ are offset circumferentially from the apertures 132, 136 distributed along the pattern $P_2$. The apertures 132, 136 distributed along the pattern $P_1$ are also arranged closer to the inner rim 118 than the apertures 132, 136 distributed along the pattern $P_2$. In some embodiments, the apertures 132, 136 in successive patterns are aligned. In some embodiments, the apertures 132 are arranged along different patterns than the apertures 136. In some embodiments, the apertures 132, 136 are arranged evenly within each pattern.

Figure 17:
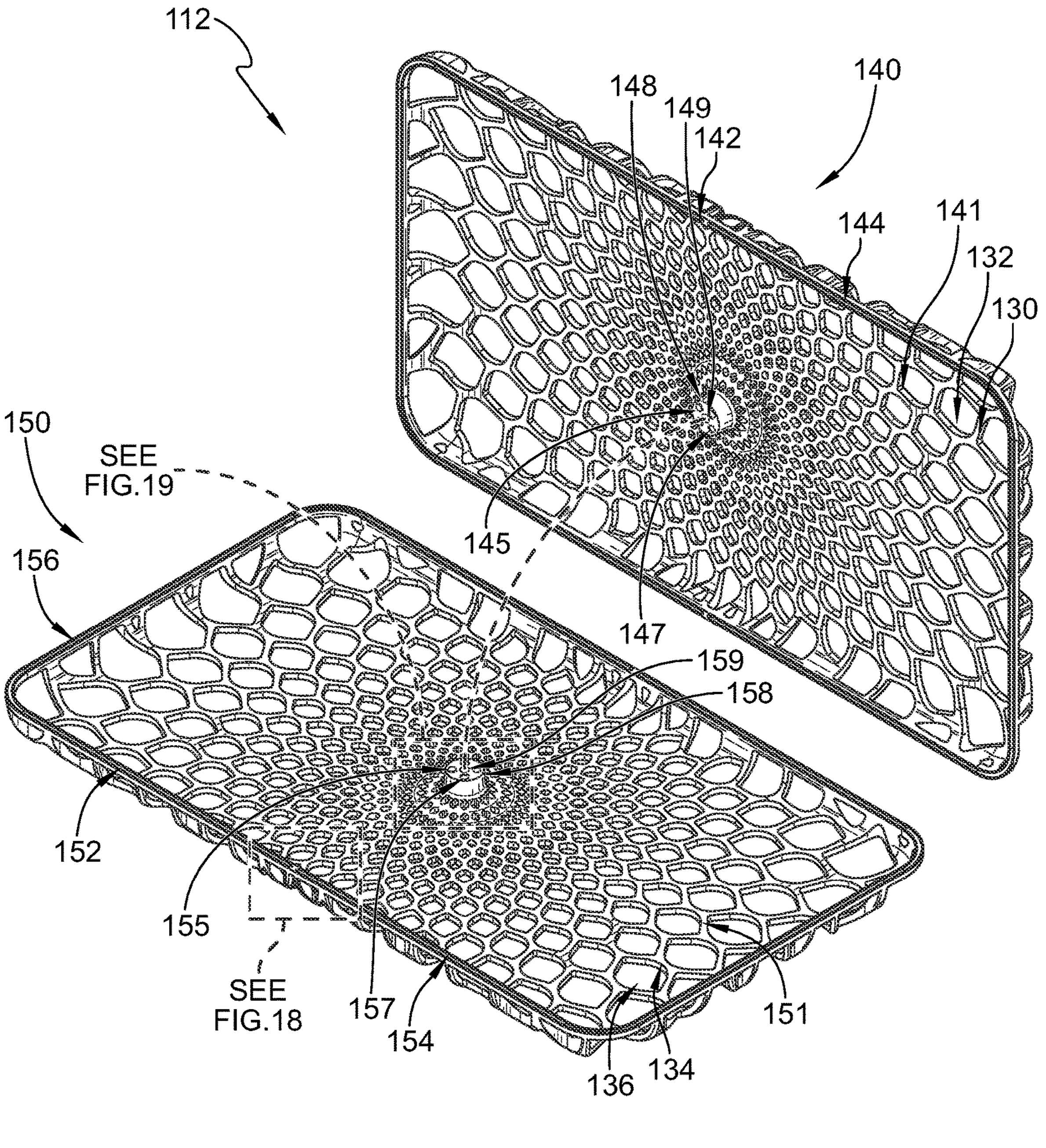
FIG. 17 is an exploded perspective assembly view of the breathable cushion frame of FIG. 11 showing that in the illustrative embodiment the frame includes a first shell including the first webbing and portions of the inner and outer rims and a second shell including the second webbing and portions of the inner and outer rims, and suggesting that the first shell is coupled to the second shell along the portions of the inner and outer rims.

In the illustrative embodiment, apertures 132, 136 arranged closer to the inner rim 118 have smaller opening areas than apertures 132, 136 arranged farther from the inner rim 118 as shown in FIGS. 13 and 17. In some embodiments, apertures 132, 136 distributed along patterns arranged closer to the inner rim 118 have smaller opening areas than apertures 132, 136 distributed along patterns arranged farther from the inner rim 118. Exemplary opening areas $A_1$, $A_2$, $A_3$ of various apertures 132, 136 arranged successively closer to the inner rim 118 are shown in FIG. 13. The opening area $A_3$ is smaller than the opening area $A_2$, which is smaller than the opening area $A_1$. In some embodiments, the apertures 132, 136 are oblong with opposing points arranged toward the outer and inner rims 116, 118 as shown in FIG. 13. In some embodiments, the apertures 132, 136 have other geometric or non-geometric shapes.

In some embodiments, the frame 112 includes a first shell 140 and a second shell 150 coupled to the first shell 140 as shown in FIG. 17. In the illustrative embodiment, the first shell 140 includes the first webbing 141 and portions 146, 148 of the outer and inner rims 116, 118, respectively, with the inner rim portion 148 defining an opening 149 through the first shell 140. The second shell 150 includes the second webbing 151 and portions 156, 158 of the outer and inner rims 116, 118, respectively, with the inner rim portion 158 defining an opening 159 through the second shell 150. In some embodiments, the shells 140, 150 are substantially identical and symmetrical to one another, and arranged to position the outer and inner rim portions 146, 148 toward the outer and inner rim portions 156, 158.

Figure 18:
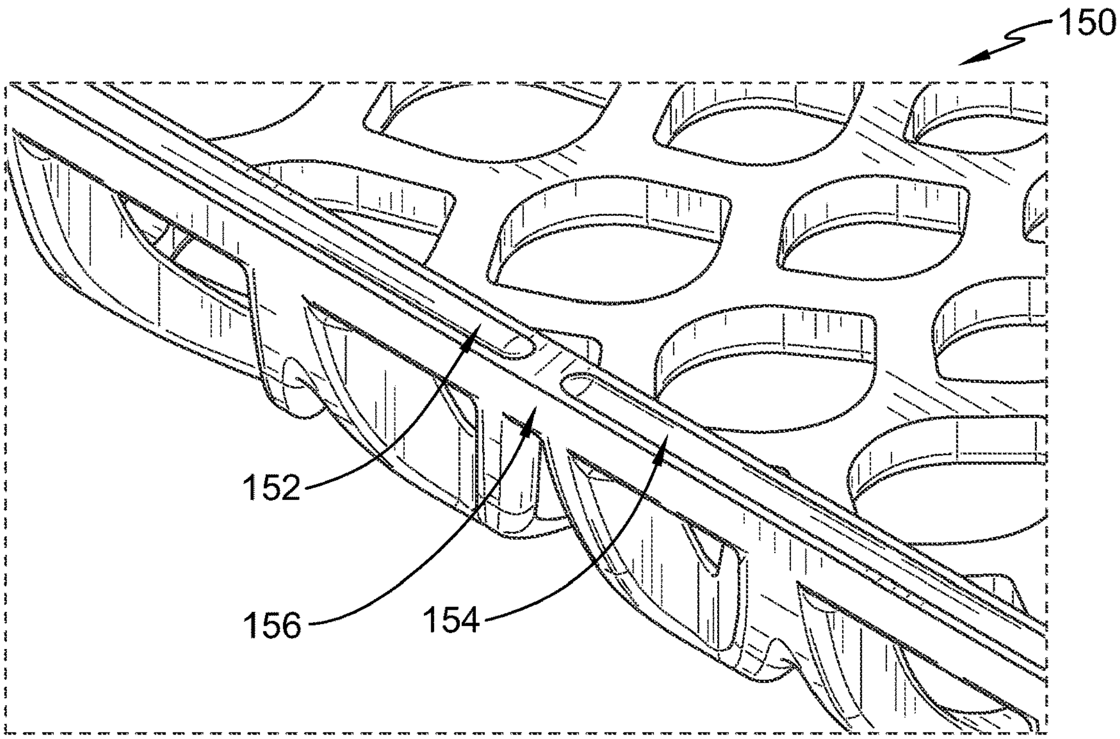
FIG. 18 is an enlarged view of the breathable cushion frame of FIG. 17 showing that complementary detents are formed on the outer rim portions for alignment of the outer rim portions of the first and second shells.
Figure 19:
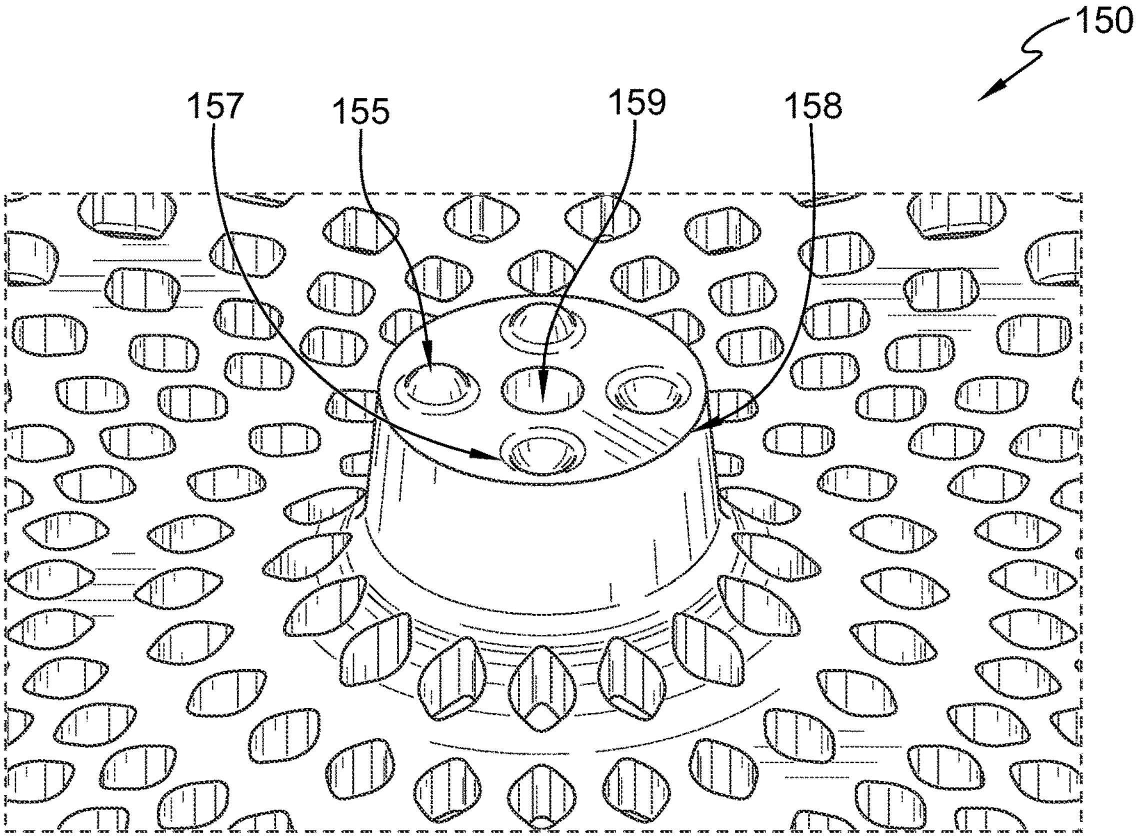
FIG. 19 is an enlarged view of the breathable cushion frame of FIG. 17 showing that complementary detents are formed on the inner rim portions for alignment of the inner rim portions of the first and second shells.

In some embodiments, complementary detents 142, 152 and 144, 154 are formed on the outer rim portions 146, 156, respectively, for alignment of the outer rim portions 146, 156 of the first and second shells 140, 150 as shown in FIGS. 17 and 18. For example, the detent 142 may be a recess formed into the outer rim portion 146 and the detent 152 may be a protrusion extending from the outer rim portion 156 and configured to be received in the recess of the detent 142 with the first shell 140 coupled to the second shell 150. The detents 152, 154 may be the same or different, with the detents 142, 144 being the opposite complement to the detents 152, 154, respectively. In some embodiments, complementary detents 145, 155 and 147, 157 are formed on the inner rim portions 148, 158, respectively, for alignment of the inner rim portions 148, 158 of the first and second shells 140, 150 as shown in FIGS. 17 and 19. For example, the detent 145 may be a recess formed into the inner rim portion 148 and the detent 155 may be a protrusion extending from the inner rim portion 158 and configured to be received in the recess of the detent 145 with the first shell 140 coupled to the second shell 150. The detents 155, 157 may be the same or different, with the detents 145, 147 being the opposite complement to the detents 155, 157, respectively. In the illustrative embodiment, the inner rim 118 defines a column (formed from inner rim portions 148, 158) extending between the first and second webbings 141, 151 as shown in FIGS. 12, 14, 17, and 19.

In some embodiments, the first shell 140 is formed as a unitary and integral structure and the second shell 150 is formed as a separate unitary and integral structure. In some embodiments, the first shell 140 is coupled to the second shell 150 along the outer rim portions 146, 156 and the inner rim portions 148, 158 by an adhesive, ultrasonic welding, or heat press process among other processes contemplated by the present disclosure. In some embodiments, the frame 112 is formed as a unitary and integral structure. In some embodiments, the outer rim 116 and/or inner rim 118 are segmented and/or removed entirely such that the first and second webbings 141, 151 engage with one another along the various sections 122, 124, 126, 128 of the frame 112 to define the lattice 111 and internal void 113.

In some embodiments, the frame 112 is formed of a flexible, resilient material. In some embodiments, the frame 112 is formed from a food-grade thermoplastic polyurethane (TPU) material. In some embodiments, the material used to form the frame 112 has a Shore A durometer hardness of about 75 to about 90. In some embodiments, the frame 112 is molded, such as using an injection, cast, or compression molding process.

Figure 20:
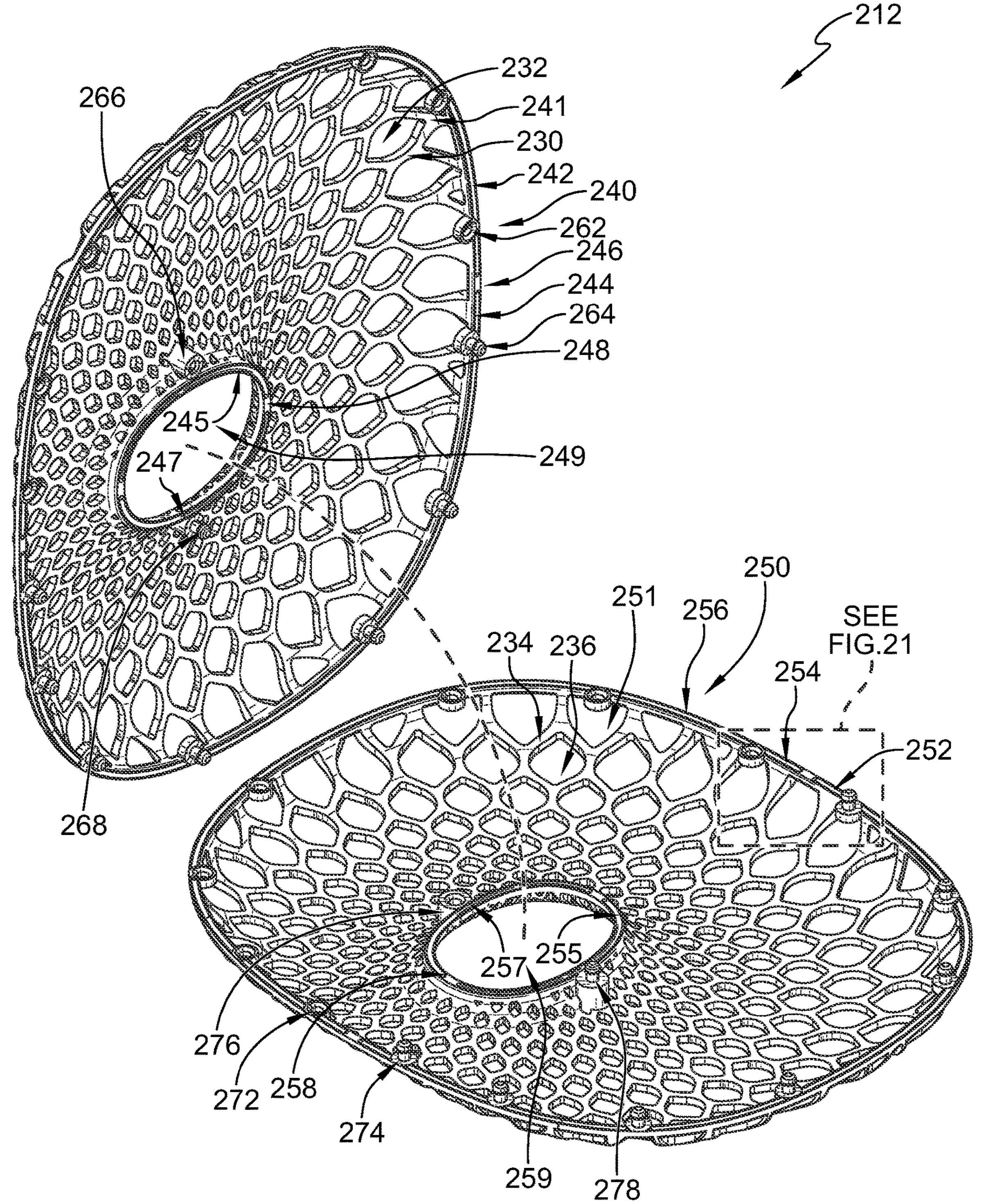
FIG. 20 is an exploded perspective assembly view of another embodiment of a breathable cushion frame in accordance with the present disclosure showing that the frame includes a first shell and a second shell coupled together by a plurality of connectors arranged along inner and outer rims of the frame.
Figure 21:
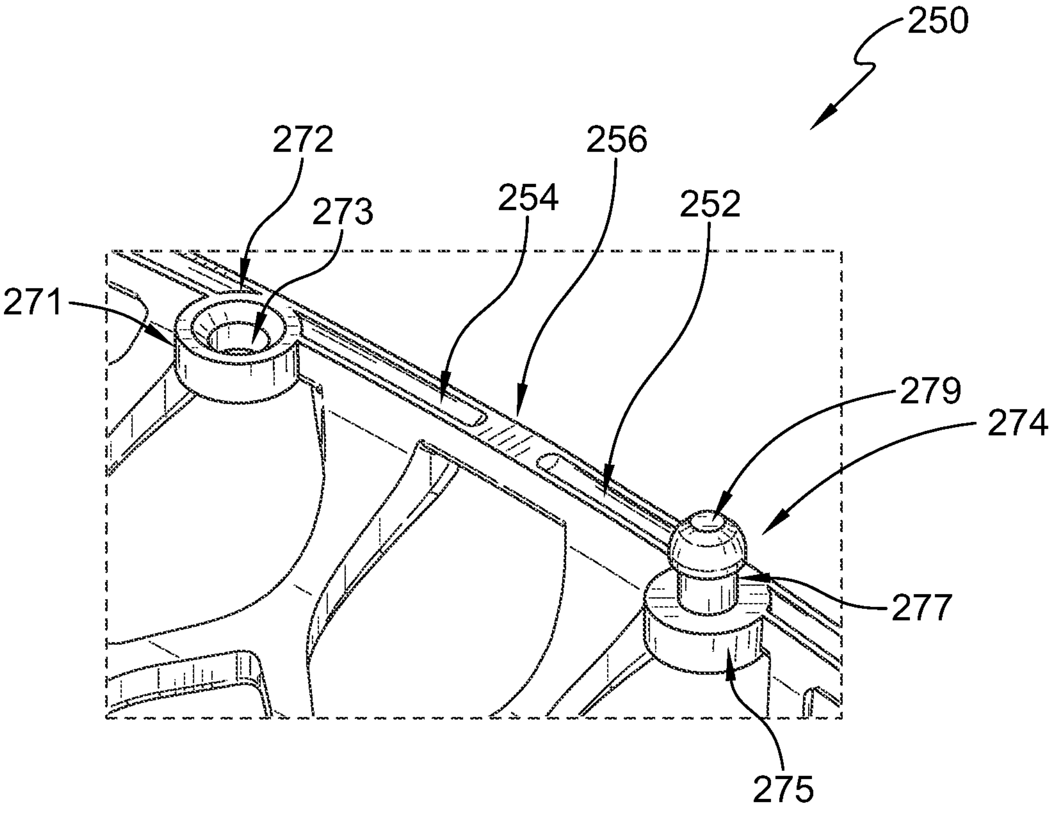
FIG. 21 is an enlarged view of the breathable cushion frame of FIG. 20 showing that each connector includes a receptacle and a fastener that extends into and engages with the receptacle to hold the first shell to the second shell.

Another exemplary embodiment of a breathable cushion frame 212 in accordance with the present disclosure is shown in FIGS. 20 and 21. The frame 212 is similar to the frame 12 shown in FIGS. 1-10, and similar numbers in the 200's are used to identify similar portions. At least one difference between the frame 212 and the frame 12 is that the first and second shells 240, 250 of the frame 212 are coupled together by connectors arranged around the outer and inner rims 216, 218. In the illustrative embodiment, each connector includes a receptacle (e.g., 262, 266, 272, 276) coupled to one of the first or second shells 240, 250 and a fastener (e.g., 264, 268, 274, 278) coupled to the other of the first or second shells 240, 250. Each receptacle includes a base 271 and a hole 273 formed through the base 271 as shown in FIG. 21. Each fastener includes a base 275, a stem 277 extending from the base 275, and a head 279 coupled to the stem 277 opposite of the base 275. The fasteners extend into and engage with the receptacles to hold the first shell 240 to the second shell 250. In some embodiments, the hole 273 of the receptacle has a first diameter, the stem 277 of the fastener has a second diameter substantially the same or smaller than the first diameter, the head 279 of the fastener has a third diameter larger than the first diameter. The head 279 extends through the hole 273 and engages with the base 271 of the receptacle to hold the stem 277 of the fastener in the hole 273 of the receptacle. In some embodiments, a mix of receptacles and fasteners are arranged on the first shell 240 with a complementary mix of receptacles and fasteners arranged on the second shell 250. In some embodiments, all fasteners are arranged on one of the first or second shells 240, 250, and all of the receptacles are arranged on the other of the first or second shells 240, 250. In some embodiments, similar connectors are used to couple together the shells 140, 150 of the frame 112 shown in FIGS. 11-19.

Some non-limiting examples of the above-described embodiments can include the following:

1. A breathable cushion frame, comprising:
   an outer rim;
   an inner rim spaced apart from the outer rim; and
   a lattice having a first webbing extending between the outer rim and the inner rim and a second webbing extending between the outer rim and the inner rim,
   wherein the second webbing is spaced apart from the first webbing to define an internal void of the breathable cushion frame, and wherein each of the first and second webbings includes a plurality of interconnected web members defining a plurality of apertures through the lattice.

2. The breathable cushion frame of 1, wherein the inner rim and outer rim are arranged along a common plane.

3. The breathable cushion frame of 1, wherein the internal void is continuous around the inner rim.

4. The breathable cushion frame of 1, wherein inner rim defines an opening through the breathable cushion frame.

5. The breathable cushion frame of 4, wherein the frame defines a continuous tube extending around the opening.

6. The breathable cushion frame of 4, wherein the frame defines a rear section, a front section arranged at an opposite side of the opening from the rear section, a right-side section extending between the front and rear sections, and a left-side section extending between the front and rear sections at an opposite side of the opening from the right-side section.

7. The breathable cushion frame of 6, wherein the left-side section and right-side section are substantially symmetrical across a centerline extending through the front and rear sections.

8. The breathable cushion frame of 7, wherein the rear section has a larger cross sectional area than the front section along a centerline extending through the front and rear sections.

9. The breathable cushion frame of 7, wherein the inner rim is arranged at a first distance from the outer rim to define the rear section and a second distance from the outer rim to define the front section.

10. The breathable cushion frame of 9, wherein second distance is smaller than the first distance.

11. The breathable cushion frame of 7, wherein the frame is tapered from the front section to the rear section at a taper angle.

12. The breathable cushion frame of 7, wherein the taper angle less than 10 degrees.

13. The breathable cushion frame of 7, wherein the front section reduces in cross sectional area from left and right toward a centerline extending through the front and rear sections.

14. The breathable cushion frame of 1, wherein the first webbing and second webbing are arranged closer together adjacent the inner and outer rims and farther apart between the inner and outer rims.

15. The breathable cushion frame of 1, wherein the first webbing extends substantially along a first plane between the inner and outer rims, wherein the second webbing extends substantially along a second plane between the inner and outer rims, and wherein the first plane is spaced apart from the second plane.

16. The breathable cushion frame of 11, wherein the apertures are distributed along the lattice in offset repeating patterns around the inner rim.

17. The breathable cushion frame of 16, wherein apertures arranged along patterns closer to the inner rim have smaller opening areas than apertures arranged farther from the inner rim.

18. The breathable cushion frame of 17, wherein the patterns are circular and successively smaller in diameter moving from the outer rim to the inner rim.

19. The breathable cushion frame of 16, wherein, within each pattern, the apertures are arranged evenly.

20. The breathable cushion frame of 1, wherein the apertures are oblong with opposing points arranged toward the inner and outer rims.

21. The breathable cushion frame of 1, wherein the outer rim is substantially rectangular.

22. The breathable cushion frame of 21, wherein the outer rim is substantially square.

23 The breathable cushion frame of 1, wherein the outer rim is oblong along a first direction, and wherein the inner rim is oblong along a second direction substantially perpendicular to the first direction.

24. The breathable cushion frame of 1, further comprising a first shell defining the first webbing and first portions of the inner and outer rims and a second shell defining the second webbing and second portions of the inner and outer rims.

25. The breathable cushion frame of 24, wherein the first and second portions of the inner rim are coupled by ultrasonic welding, and wherein the first and second portions of the outer rim are coupled by ultrasonic welding.

26. The breathable cushion frame of 24, further comprising a plurality of connectors arranged along the inner and outer rims, wherein the connectors are configured to couple the first shell to the second shell.

27. The breathable cushion frame of 26, wherein the connectors each include a receptacle coupled to one of the first or second shells and a fastener coupled to the other of the first or second shells, and wherein the fastener extends into and engages with the receptacle to hold the first shell to the second shell.

28. The breathable cushion frame of 29, wherein each receptacle defines a hole having a first diameter, wherein each fastener includes a stem and a head coupled to the stem, wherein the stem has a second diameter substantially the same or smaller than the first diameter, and wherein the head has a third diameter larger than the first diameter.

29. The breathable cushion frame of 24, further comprising complimentary detents on the inner and outer rims for alignment of the first and second shells.

30. The breathable cushion frame of 29, wherein the first and second shells are symmetrical to one another.

31. The breathable cushion frame of 24, wherein the first webbing and first portions of the inner and outer rims are unitary and integral, and wherein the second webbing and second portions of the inner and outer rims are unitary and integral.

32. The breathable cushion frame of 1, wherein the lattice, inner rim, and outer rim are unitary and integral.

33. The breathable cushion frame of 1, wherein the frame is formed from a flexible, resilient material.

34 The breathable cushion frame of 33, wherein the frame is formed from thermoplastic polyurethane.

35. The breathable cushion frame of 33, wherein the material has a Shore A durometer hardness of about 75 to about 90.

36. The breathable cushion frame of 1, wherein the inner rim defines a column.

37. A breathable cushion, comprising:

a cover; and the breathable cushion frame of 1 arranged inside the cover.

38. The breathable cushion of 37, wherein the cover is a fabric material.

39. A breathable cushion frame, comprising:

a lattice having a first webbing and a second webbing, each of the first and second webbings includes a plurality of interconnected web members defining a plurality of apertures through the lattice, wherein the second webbing is spaced apart from the first webbing to define an internal void of the breathable cushion frame, and wherein the lattice extends around an opening through the breathable cushion frame to define a continuous tube extending around the opening.

The variations and benefits of each embodiment described herein are equally applicable to the other embodiments described herein, and any combinations therebetween are fully contemplated by the present disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A breathable cushion frame, comprising:

an outer rim;

an inner rim spaced apart from the outer rim; and a lattice having a first webbing extending between the outer rim and the inner rim and a second webbing extending between the outer rim and the inner rim, wherein a first shell defines the first webbing and first portions of the inner and outer rims and a second shell defines the second webbing and second portions of the inner and outer rims, wherein a plurality of connectors are arranged along the inner and outer rims and configured to couple the first shell to the second shell, wherein the connectors each include a receptacle coupled to one of the first or second shells and a fastener coupled to the other of the first or second shells, wherein the fastener extends into and engages with the receptacle to hold the first shell to the second shell, wherein the second webbing is spaced apart from the first webbing to define an internal void of the breathable cushion frame, and wherein each of the first and second webbings includes a plurality of interconnected web members defining a plurality of apertures through the lattice.

2. The breathable cushion frame of claim 1, wherein the internal void is continuous around the inner rim.

3. The breathable cushion frame of claim 1, wherein inner rim defines an opening through the breathable cushion frame.

4. The breathable cushion frame of claim 3, wherein the breathable cushion frame defines a continuous tube extending around the opening.

5. The breathable cushion frame of claim 1, wherein the first webbing and second webbing are arranged closer together adjacent the inner and outer rims and farther apart between the inner and outer rims.

6. The breathable cushion frame of claim 1, wherein the first webbing extends substantially along a first plane between the inner and outer rims, wherein the second webbing extends substantially along a second plane between the inner and outer rims, and wherein the first plane is spaced apart from the second plane.

7. The breathable cushion frame of claim 1, wherein the plurality of apertures are distributed along the lattice in offset repeating patterns around the inner rim.

8. The breathable cushion frame of claim 7, wherein apertures arranged along patterns closer to the inner rim have smaller opening areas than apertures arranged farther from the inner rim.

9. The breathable cushion frame of claim 8, wherein the patterns are circular and successively smaller in diameter moving from the outer rim to the inner rim.

10. The breathable cushion frame of claim 1, wherein the outer rim is substantially rectangular.

11. The breathable cushion frame of claim 1, wherein the outer rim is oblong along a first direction, and wherein the inner rim is oblong along a second direction substantially perpendicular to the first direction.

12. A breathable cushion, comprising:

a cover; and the breathable cushion frame of claim 1 arranged inside the cover.

13. The breathable cushion of claim 12, wherein the cover is a fabric material.

14. The breathable cushion frame of claim 1, wherein each receptacle defines a hole having a first diameter, wherein each fastener includes a stem and a head coupled to the stem, wherein the stem has a second diameter the same or smaller than the first diameter, and wherein the head has a third diameter larger than the first diameter.

15. The breathable cushion frame of claim 1, wherein the first and second shells are symmetrical to one another.

16. The breathable cushion frame of claim 1, wherein the first webbing and first portions of the inner and outer rims are unitary and integral, and wherein the second webbing and second portions of the inner and outer rims are unitary and integral.

17. The breathable cushion frame of claim 1, wherein the first and second inner rim portions together define the inner rim, wherein inner rim defines an opening through the breathable cushion frame, and wherein the internal void is continuous around the inner rim.

* * * * *